United States Patent
Combe

(10) Patent No.: US 6,301,087 B1
(45) Date of Patent: Oct. 9, 2001

(54) MAGNETO-RESISTIVE REMOVABLE HARD DISK CARTRIDGE AND DISK DRIVE AND QUADRATURE EMBEDDED SERVO BURSTS

(75) Inventor: Anthony David Combe, Dunfermline Fife (GB)

(73) Assignee: Nomai S.A. (FR)

( * ) Notice: Subject to any disclaimer, the term of this patent is extended or adjusted under 35 U.S.C. 154(b) by 0 days.

(21) Appl. No.: 08/274,771

(22) Filed: Jul. 14, 1994

(51) Int. Cl.$^7$ ..................................................... G11B 5/40
(52) U.S. Cl. ........................... 360/323; 360/122; 360/320
(58) Field of Search ..................................... 360/119, 133, 360/99.06, 113, 323, 320, 122

(56) References Cited

U.S. PATENT DOCUMENTS

| | | | |
|---|---|---|---|
| 4,317,149 | * | 2/1982 | Elser et al. ............................. 360/126 |
| 4,800,454 | * | 1/1989 | Schwarz et al. ....................... 360/103 |
| 5,140,479 | * | 8/1992 | Elsing et al. ......................... 360/97.01 |
| 5,272,582 | * | 12/1993 | Shibata et al. ......................... 360/113 |
| 5,465,186 | * | 11/1995 | Bajorek et al. ......................... 360/113 |
| 5,473,484 | * | 12/1995 | Dunfield et al. .................... 360/99.08 |
| 5,485,331 | * | 1/1996 | Dunfield et al. .................... 360/99.08 |

OTHER PUBLICATIONS

Dennis C. Mee and Eric D. Daniel, "Magnetic Recording Hanbook," pp. 338–340, 344–346, 766–768, 772–773, 794–795, Dec. 1990.*

"Dependence of Magnetoresistive Head Readback Characteristics on Sensor Height", Journal of Applied Physics, 69(8), Apr. 15, 1991, A. Wallash, M. Salo, J. Lee, D. Heim and G. Garfunkel.

* cited by examiner

Primary Examiner—David Hudspeth
Assistant Examiner—James L Habermehl
(74) Attorney, Agent, or Firm—Blakely, Sokoloff, Taylor & Zafman LLP

(57) ABSTRACT

A disk drive comprises a magneto-resistive read head and an inductive write head for use with removable hard disk cartridges. A four-burst embedded servo is written and read to guide the servo-positioning of the magneto-resistive read head over data tracks recorded on the removable hard disk.

6 Claims, 5 Drawing Sheets

MAGNETO-RESISTIVE REMOVABLE HARD DISK CARTRIDGE AND DISK DRIVE AND QUADRATURE EMBEDDED SERVO BURSTS

BACKGROUND OF THE INVENTION

1. Field of the Invention

The invention relates generally to computer memory and more specifically to removable hard disk cartridges and disk drives.

2. Description of the Prior Art

The recording and reading of rotating magnetic hard disks has conventionally included the use of inductive read/write heads. However, as track densities have increased, conflicts have arisen between optimum read head design and optimum write head design. Higher recording frequencies require less inductance and therefore fewer coil turns in the head. The narrower recorded data tracks produce fainter pickup signals, so more sensitivity is required and this means more coil turns are needed in the head.

Magneto-resistive materials have recently been employed in magnetic disk recording read heads. Such materials experience a change in their resistance in the presence of magnetic flux. A change of two percent in the resistance is typical. However, the change in resistance is not linear and a magnetic bias is required to move the center point of operation into a small area that is linear. Such bias is typically provided by a small permanent magnet positioned nearby.

Magneto-resistive (MR) heads are easily saturated by ordinary disk recording levels and for this reason, hard disks recorded by ordinary inductive read/write (R/W) heads are not always compatible with MR head disk drives. In fixed disk drives this is not a problem because the read and write heads and hard disk are part of a permanent set. In removable hard disk drives this can be a significant problem area.

MR heads typically have narrow pickup widths. Within a comparatively widely-written data track, the narrow read width is not a problem. In fact, some extra degree of disk run out and track misregistration can be tolerated as the MR head can be allowed to wander within a data track radially without producing a concomitant read-amplitude variation.

Prior art embedded servos are a problem with MR heads because of the narrow read width. A typical prior art embedded servo consists of two bursts, an "A" burst and a "B" burst, that head a block on a data track. The "A" burst is offset radially one-half of a track width, and the "B" burst is offset radially in the opposite direction one-half of a track width and longitudinally behind the "A" burst. An inductive R/W head passing the "A" and "B" bursts while at center track will glance both bursts equally and will produce output pulses for each of equal amplitude. If the R/W head is off center, the pulses will not be equal in amplitude, and which one has the greater amplitude will indicate which radial direction the R/W head is from dead center. A servo system is conventionally employed to keep the R/W head at track center in real time, even if the recorded track is not perfectly circular or perfectly concentric with the disk hub. A typical MR head has a read width so narrow that the "A" or "B" servo bursts may not be seen at all as the head moves from track center by more than 25% of a track width. Further complicating the use of MR heads with embedded servo features is the fact that MR heads often do not present symmetrical responses, thus comparative "A" and "B" burst amplitudes are not necessarily representative of the MR head position between the bursts. In fact, a properly positioned MR head can fail to recognize its good position by responding differently to bursts that are on opposite sides and/or that have opposite polarities.

The asymmetry of MR element off-track performance can be adequately modeled as the area of the stripe of MR material subjected to a magnetic field as the element passes over an isolated track written with an inductive head. The magnetic field propagates through the MR stripe normal to the angle of MR bias. This angle of incidence along with a nearby permalloy shield casts a magnetic shadow over the element. Such a shadow causes the asymmetry in sideways reading that an MR element shows when it moves off track in opposite directions. Thus the degree of asymmetry is dependent on the MR stripe height and bias angle. Such subjects are discussed by A. Wallash, et al., in "Dependence of magneto-resistive head read back characteristics on sensor height", published in the *Journal of Applied Physics*, 69(8), Apr. 15, 1991.

Simply moving the "A" and "B" bursts such that they are offset radially from track center so that they can be detected by the MR head at a certain track offset is not completely satisfactory because the detection of other track offsets by the MR head will be compromised. The MR head can get lost in the blank area that would be created between adjacent tracks.

The prior art describes magneto-resistive read heads only in fixed hard disk drives. The problems that are encountered in removable hard disk applications have so far been left unaddressed, even by those advanced in the development of the art, e.g., IBM.

SUMMARY OF THE PRESENT INVENTION

It is therefore an object of the present invention to provide a magneto-resistive removable hard disk cartridge system.

It is another object of the present invention to provide hard disk cartridge system that provides for the interchangeability of hard disk cartridges between disk drives.

It is an object of the present invention to provide hard disk cartridge system that provides consistent recording levels on the hard disk cartridges.

It is a further object of the present invention to provide an embedded servo method for magneto-resistive hard disk recording.

Briefly, an embodiment of the present invention comprises a disk drive with a magneto-resistive read head and an inductive write head for use with removable hard disk cartridges. A four-burst embedded servo is written and read to guide the servo-positioning of the magneto-resistive read head over data tracks recorded on the removable hard disk.

An advantage of the present invention is that a magneto-resistive hard disk drive is provided that accepts removable cartridges.

Another advantage of the present invention is that an embedded servo method is provided for magneto-resistive hard disk recording.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
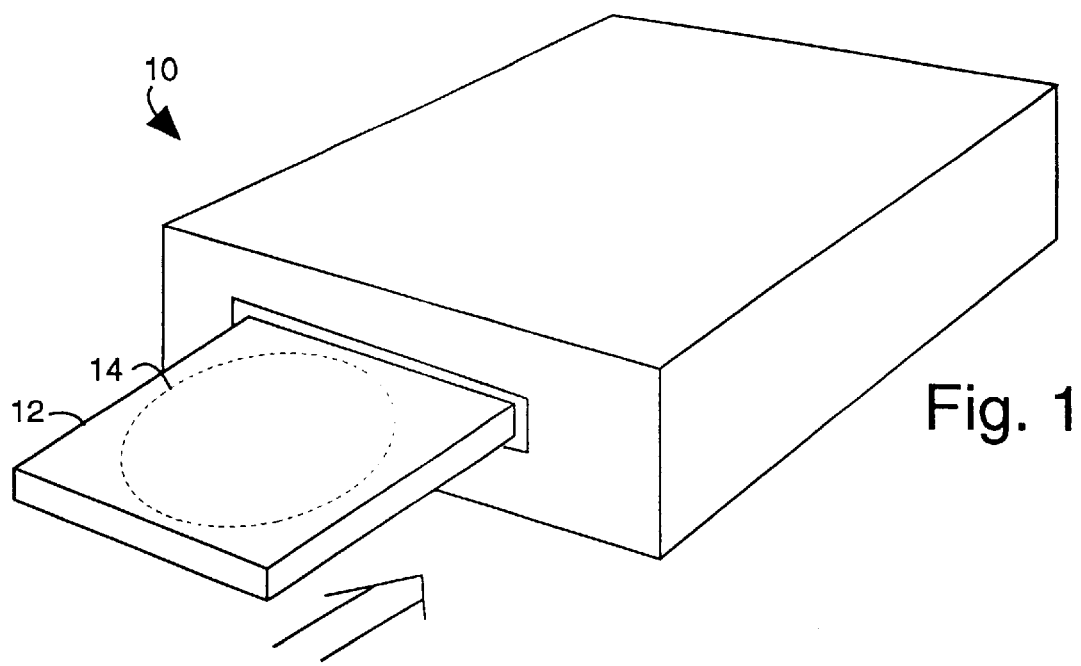
FIG. 1 is a perspective view of a removable disk cartridge and disk drive embodiment of the present invention.

FIG. 1 illustrates a removable cartridge disk drive embodiment of the present invention, referred to herein by the general reference numeral 10. Disk drive 10 accepts a removable cartridge 12 that includes a magnetic hard disk 14.

Figure 2:
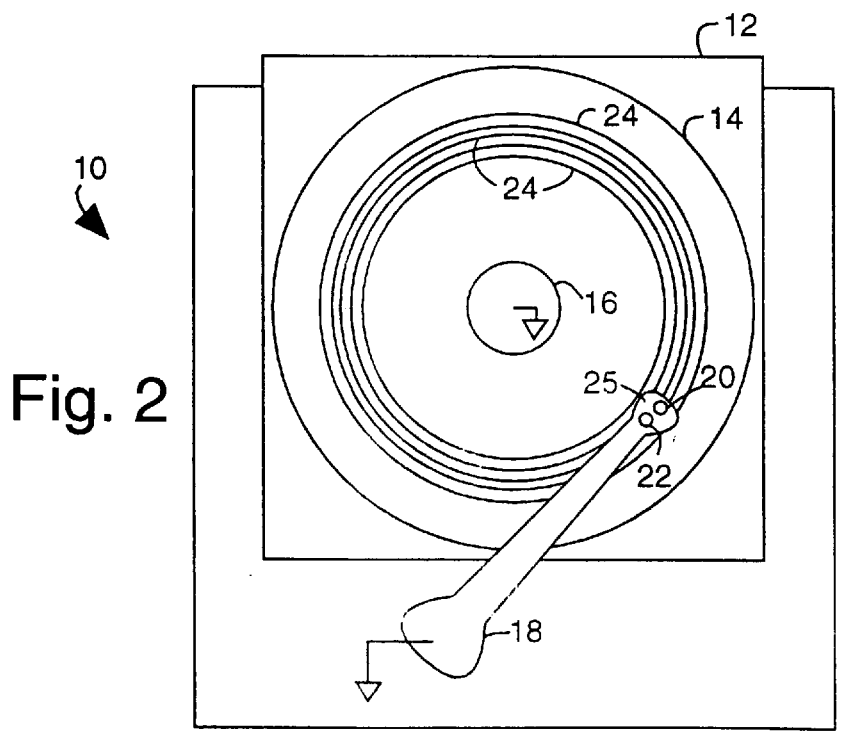
FIG. 2 is a cutaway view of the disk cartridge in place in the disk drive of FIG. 1.

FIG. 2 shows disk drive 10 in cutaway with the removable cartridge 12 in position for disk storage read/write operation. A hub 16 included in disk drive 10 engages the hard disk 14 and rotates it at a controlled speed on a hub 16. An actuator arm 18 carries a magneto-resistive (MR) read head 20 for reading and an inductive head 22 for writing a plurality of data tracks 24 with embedded servo features on the surface of hard disk 14. Since MR read head 20 is subject to damage by electrostatic discharge (ESD), it is preferable to ground hard disk 14 through hub 16 to disk drive 10 and to ground MR read head 20 also to disk drive 10. Overall, the voltage difference between the MR read head 20 and hard disk 14 is preferably controlled to not exceed two or three volts. A coating of carbon-like material, such as diamond, or other such hard and wear resistant material is preferably placed over MR read head 20 to protect it from its regular contact with hard disk 14. Such coatings for wear protection are conventional and therefore an illustration of this simple measure is unnecessary here.

Figure 3:
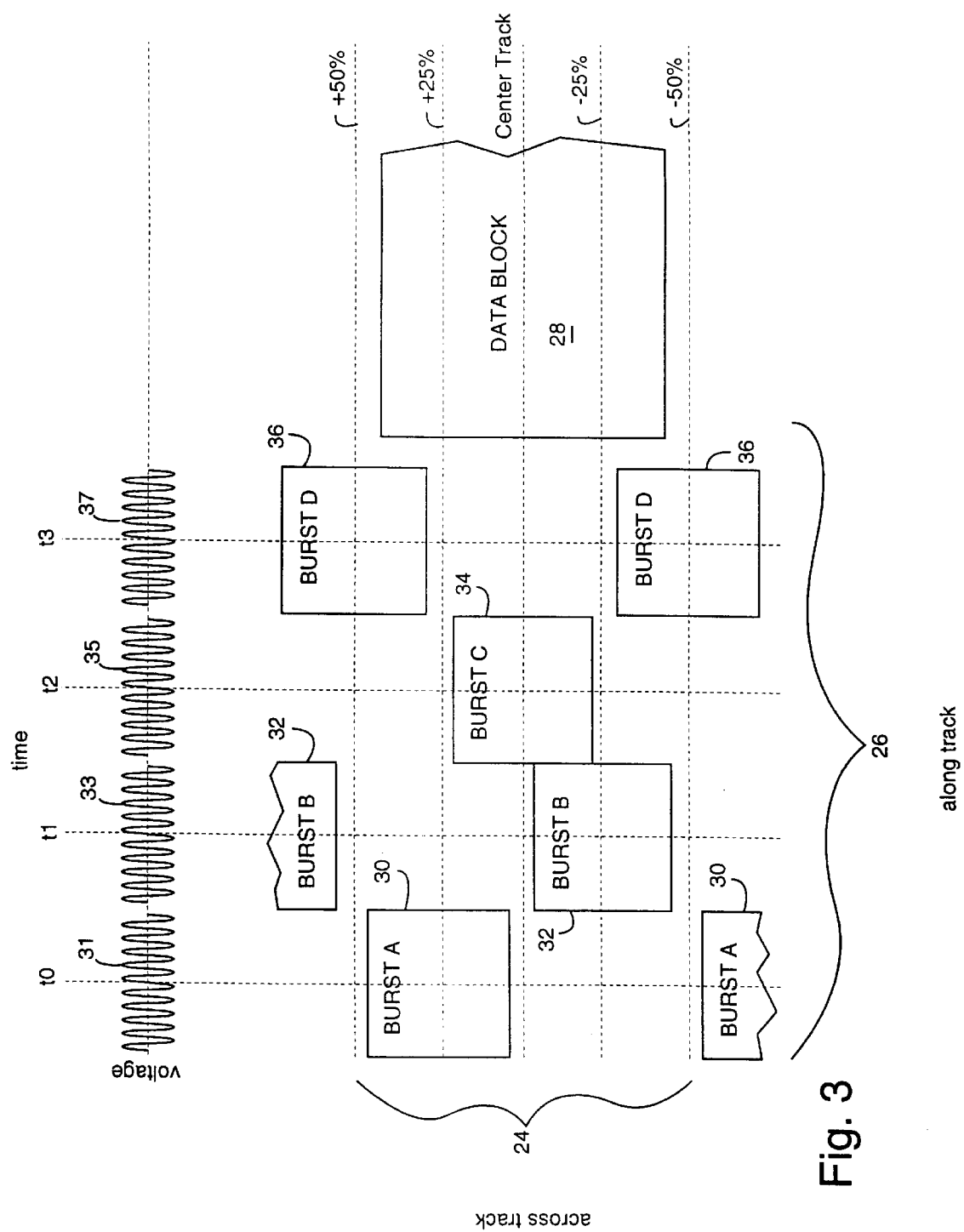
FIG. 3 is a diagram of an embedded servo burst and data block for a typical data track shown in the hard disk of FIG. 2.

FIG. 3 illustrates a typical data track 24 which comprises a servo frame 26 followed by a data block 28 which is 80% of the nominal track width. The ideal center of all the data tracks 24 are circles concentric with one another and hub 16. However, in practice, the data tracks 24 will have some amount of wobble, or run out, and it is the job of a servo system to not only position the heads 20 and 22 over an appropriate data track 24, but to cause the actuator 18 to be moved such that the heads 20 and 22 will follow the eccentricities. In general, it may be necessary to position the heads at an offset to the center of a track to optimize the writing of data on the track. Each servo frame 26 begins with an "A" burst 30, which will produce a di-bit pulse series 31 in the MR head 20 at a time t0. This is followed by a "B" burst 32, which will produce a di-bit pulse series 33 at the center time t1. At a time t2, a "C" burst 34 will produce a di-bit pulse series 37. The fourth burst time period, a time t3, has a "D" burst 36, which will produce a di-bit pulse series 37. Given that the MR head 20 has a response that results in a read width so narrow that only radially adjacent bursts can be simultaneously detected, the relative radial position of the MR head 20 anywhere over data track 24 can be ascertained. For di-bit pulse series 31, 33, 35 and 37, a servo burst frequency of five megahertz and a length of 4.6 microseconds has produced good results.

If the MR head 20 is off track by +50% of a full track width, "A" burst 30 and adjacent track "B" burst 32 will produce equal amplitude t0 and t1 di-bit pulse series 31 and 33. No t2 di-bit pulse series 35 will be present and t3 di-bit pulse series 37 will be stronger than normal. Other track offsets can similarly be determined and an appropriate servo signal can be formulated using conventional techniques to move actuator 18 radially inward or outward.

Figure 4:
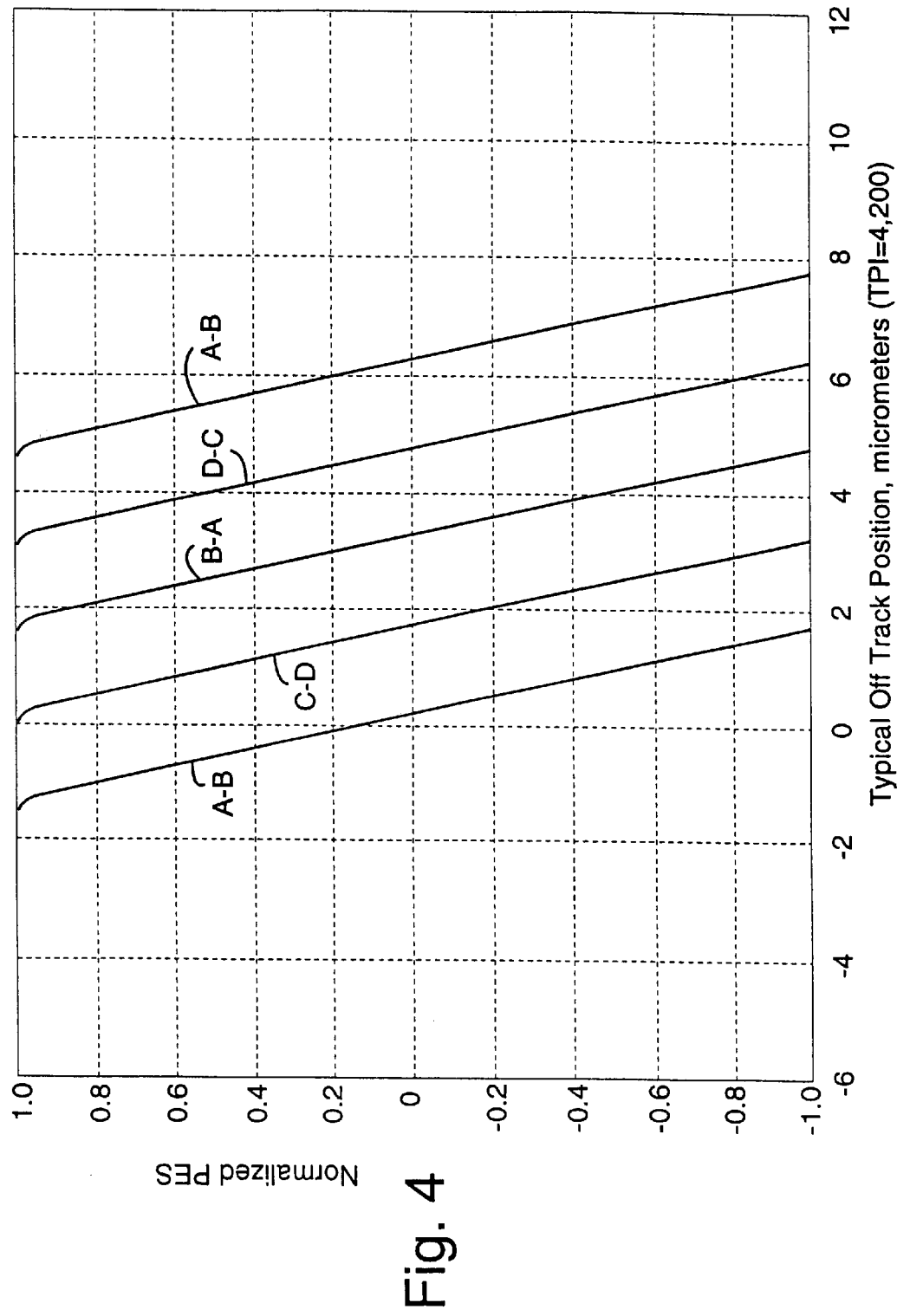
FIG. 4 is a graph of the typical position error signal (PES) read versus off-track position of a MR head tested, with a width of one-half track, at a density of 4,200 tracks per inch.

FIG. 4 graphs a position error signal (PES) expected for various off-track positions of the MR head 20.

Figure 5:
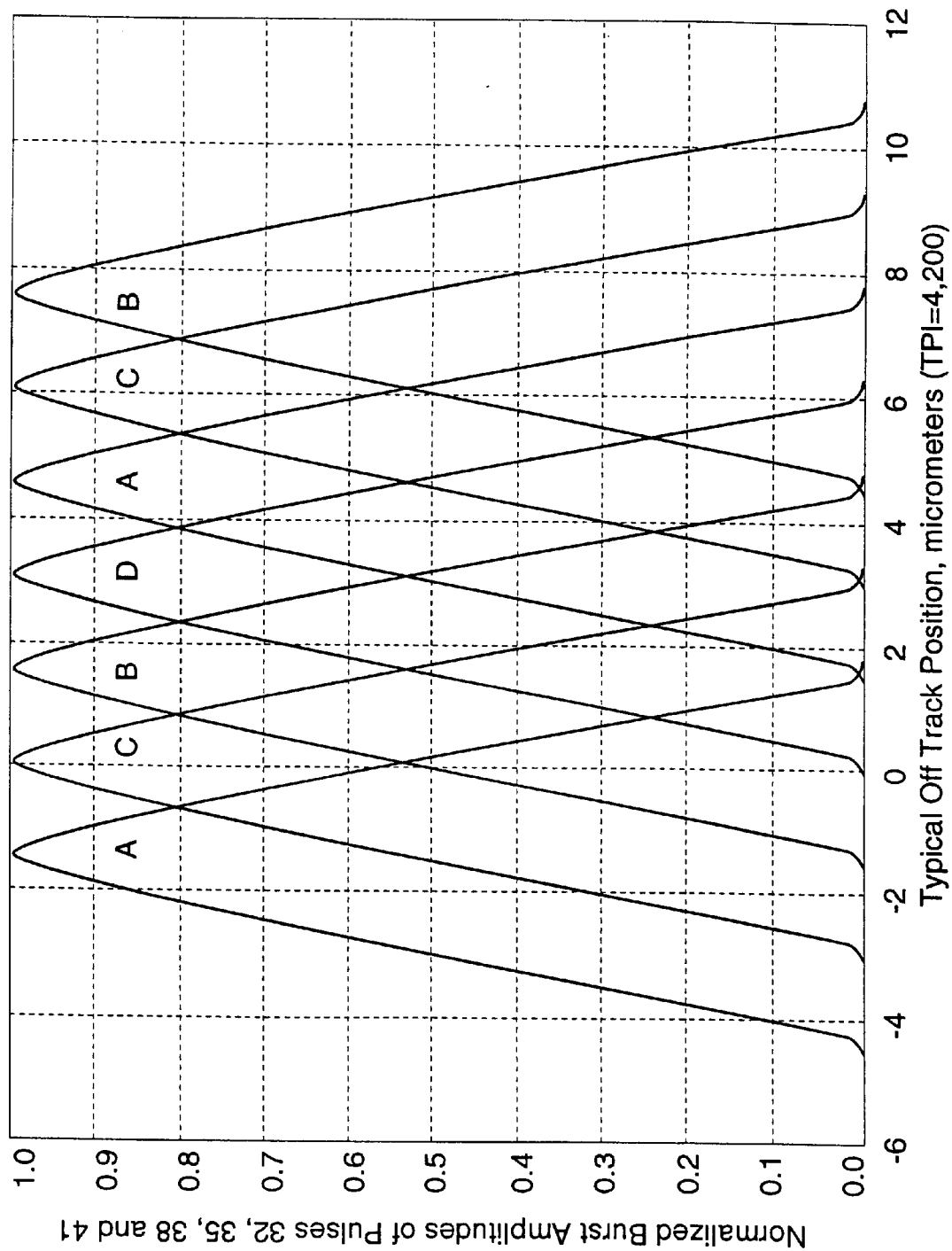
FIG. 5 is a graph of the normalized burst amplitudes of the disk drive of FIG. 1 and geometry of FIG. 4 plotted against off-track position of the MR head.

FIG. 5 is a graph of the expected and normalized burst amplitudes of di-bit pulse series 31, 33, 35 and 37, plotted against various off-track positions of the MR head 20. A linear portion of at least of each "A" through "D" burst is available for servo-positioning over the entire width of track 24.

Figure 6:
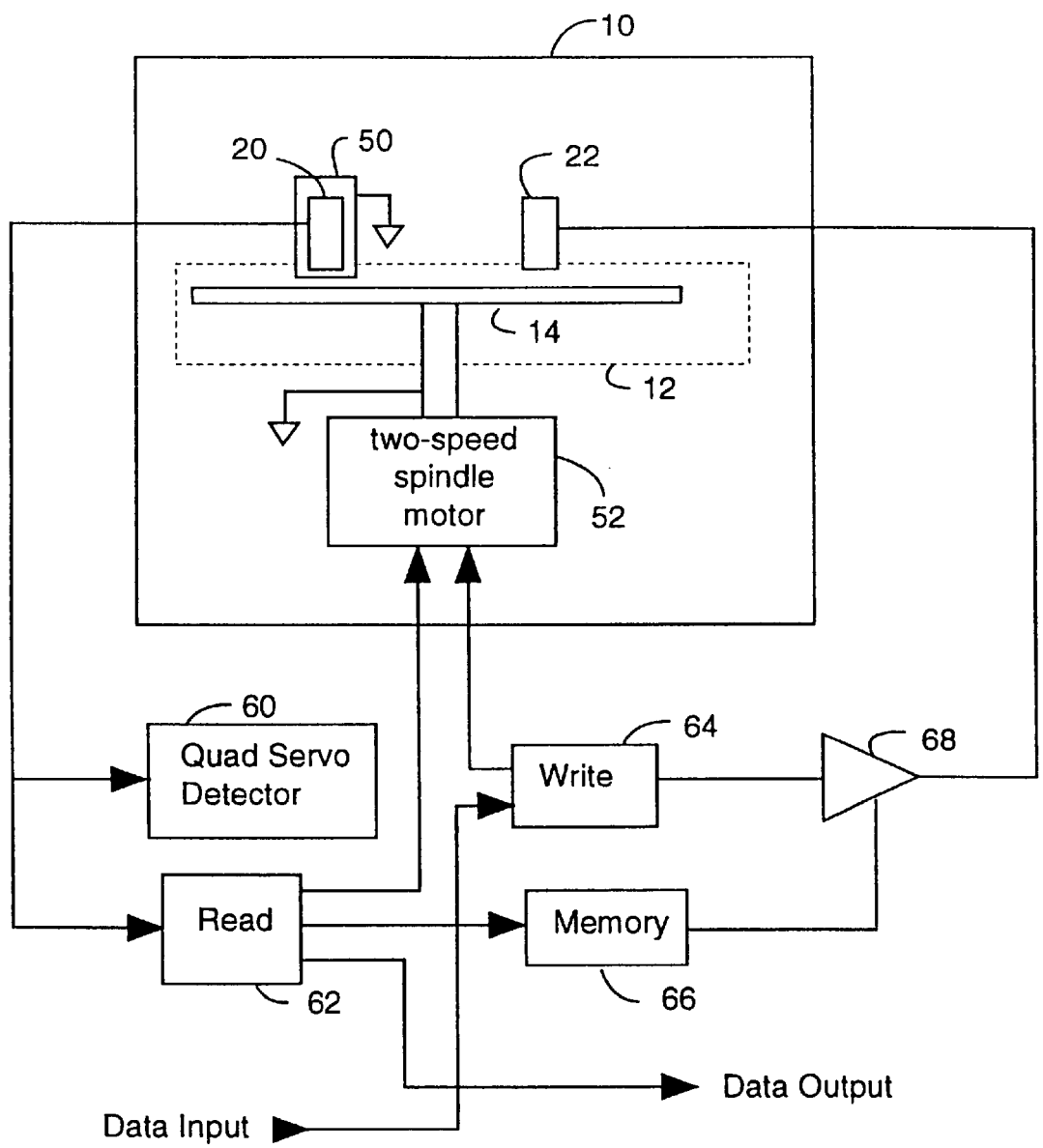
FIG. 6 is a block diagram of the electronics used to support the recording and reading operations of the heads included in the disk drive of FIG. 1.

Each inductive write head 22 and MR read head 20 will typically have a response or signal sensitivity that varies from one production unit to the next. Therefore, it is preferable to equip disk drive 10 with some form of non-volatile memory that can be used to store a digital value representing a write current amplitude for driving inductive write head 22. By controlling the write current, the read back signal quality becomes more consistent and the population of MR read heads that can be used in production is increased. Fig. 6 shows the disk drive 10 with the cartridge 12 inserted. The protective capping of the MR read head 20 is represented by a box 50 that is grounded to the disk drive 10. A two speed spindle motor 52 provides different rotational speeds for the hard disk 14 according to whether MR head 20 is reading or inductive head 22 is writing. The disk drive 10 further includes a quadrature servo burst detector 60 for interpreting di-bit pulse series 31, 33, 35 and 37, a read back amplifier 62 that provides a recorded data output, a write circuit 64 that provides an input for data to be recorded, a memory 66 with which to store a representation of a write current amplitude, and a variable gain amplifier 68 that varies the output current applied to write head 22 in accordance to the value stored in the memory 66.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A rotating disk drive for the magnetic storage of computer data, comprising:

a grounded actuator arm with an inductive head for writing and a magneto-resistive (MR) read head for reading a plurality of data tracks with embedded servo features on a surface of a rotating magnetic rigid disk within a removable cartridge;

grounding means for connecting said rotating magnetic rigid disk to a disk drive ground and the actuator to provide electrostatic discharge (ESD) protection to said MR head, wherein the voltage potential between said MR head and said rotating magnetic rigid disk is limited to two to three volts; and cartridge receiving means proximate to the magneto-resistive read head for accepting and ejecting said removable cartridge.

2. The drive of claim 1, further comprising:

a protective layer of hard and conductive material capping said magneto-resistive read head for separating it from said removable cartridge, wherein said magneto-resistive read head is protected from electrostatic discharge, wear and contamination.

3. The drive of claim 1, further comprising:

read back means connected to the magnetoresistive read head for reading a track of data previously recorded by an inductive head with said removable cartridge.

4. The drive of claim 1, further comprising:

spindle rotation means connected to said cartridge receiving means for rotating said removable cartridge at a first speed while reading a track of data previously recorded by an inductive head at a second speed with said removable cartridge, wherein said first and second speeds are independent.

5. The drive of claim 1, further comprising:

embedded servo control means including a servo track pattern on said removable cartridge with a set of four positioning bursts written at four times a basic track density, wherein the magneto-resistive read head has available a linear servo feedback signal over the full width of said data track.

6. The drive of claim 1, further comprising:

embedded servo control means including a servo track pattern on said removable cartridge with a set of at least four positioning bursts written at least at four times a basic track density, wherein the magneto-resistive read head has available a linear servo feedback signal over the full width of said data track.

* * * * *